United States Patent
Li

(10) Patent No.: US 7,685,219 B2
(45) Date of Patent: Mar. 23, 2010

(54) PARALLEL SYSTOLIC CORDIC ALGORITHM WITH REDUCED LATENCY FOR UNITARY TRANSFORM OF COMPLEX MATRICES AND APPLICATION TO MIMO DETECTION

(75) Inventor: Guangjie Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1025 days.

(21) Appl. No.: 11/394,898

(22) Filed: Mar. 31, 2006

(65) Prior Publication Data

US 2007/0237252 A1  Oct. 11, 2007

(51) Int. Cl.
*G06F 17/14* (2006.01)
*G06F 7/38* (2006.01)

(52) U.S. Cl. .................................... 708/400; 708/442

(58) Field of Classification Search ................. 708/400, 708/422
See application file for complete search history.

(56) References Cited

U.S. PATENT DOCUMENTS

| 7,337,204 B2 * | 2/2008 | Dor et al. ..................... 708/400 |
| 2006/0109934 A1 * | 5/2006 | Krupka et al. .............. 375/340 |
| 2008/0187066 A1 * | 8/2008 | Wang et al. ................. 375/267 |

* cited by examiner

*Primary Examiner*—Tan V Mai
(74) *Attorney, Agent, or Firm*—Kacvinsky LLC

(57) ABSTRACT

Various embodiments include a parallel coordinate rotation digital computer (CORDIC) technique, according to which multiple elements in a vector representing a received multiple input multiple output (MIMO) signal may be processed in parallel. The result is a reduction in the computational complexity of the MIMO detection technique as measured by the required resources and the latency. Other embodiments are described and claimed.

14 Claims, 8 Drawing Sheets

PARALLEL SYSTOLIC CORDIC ALGORITHM WITH REDUCED LATENCY FOR UNITARY TRANSFORM OF COMPLEX MATRICES AND APPLICATION TO MIMO DETECTION

BACKGROUND

Modern wireless communication systems may operate according to standards such as the Institute of Electrical and Electronics Engineers (IEEE) 802.11 standards for Wireless Local Area Networks (WLANs), the IEEE 802.16 standards for Wireless Metropolitan Area Networks (WMANs), and the $3^{rd}$ Generation Partnership Project for Long Term Evolution of wireless networks (3GPP LTE) standards. Worldwide Interoperability for Microwave Access (WiMAX) is a wireless broadband technology based on the IEEE 802.16 standard of which IEEE 802.16-2004 and the 802.16e amendment are Physical (PHY) layer specifications.

Wireless communications systems, for example those operating to the IEEE 802.11, IEEE 802.16, and 3GGP LTE standards, may implement multiple input multiple output (MIMO) technology to increase the data rate of the wireless service. MIMO technology allows spatial multiplexing of data streams from one or multiple users. The performance and complexity of MIMO systems depends largely on the number of antennas used. In practice, it is a significant challenge to support high data rates and large numbers of antennas. There is a need, therefore, to develop highly efficient architectures for realization of different signal processing algorithms in MIMO systems having a large number of antenna elements.

DETAILED DESCRIPTION

Figure 1:
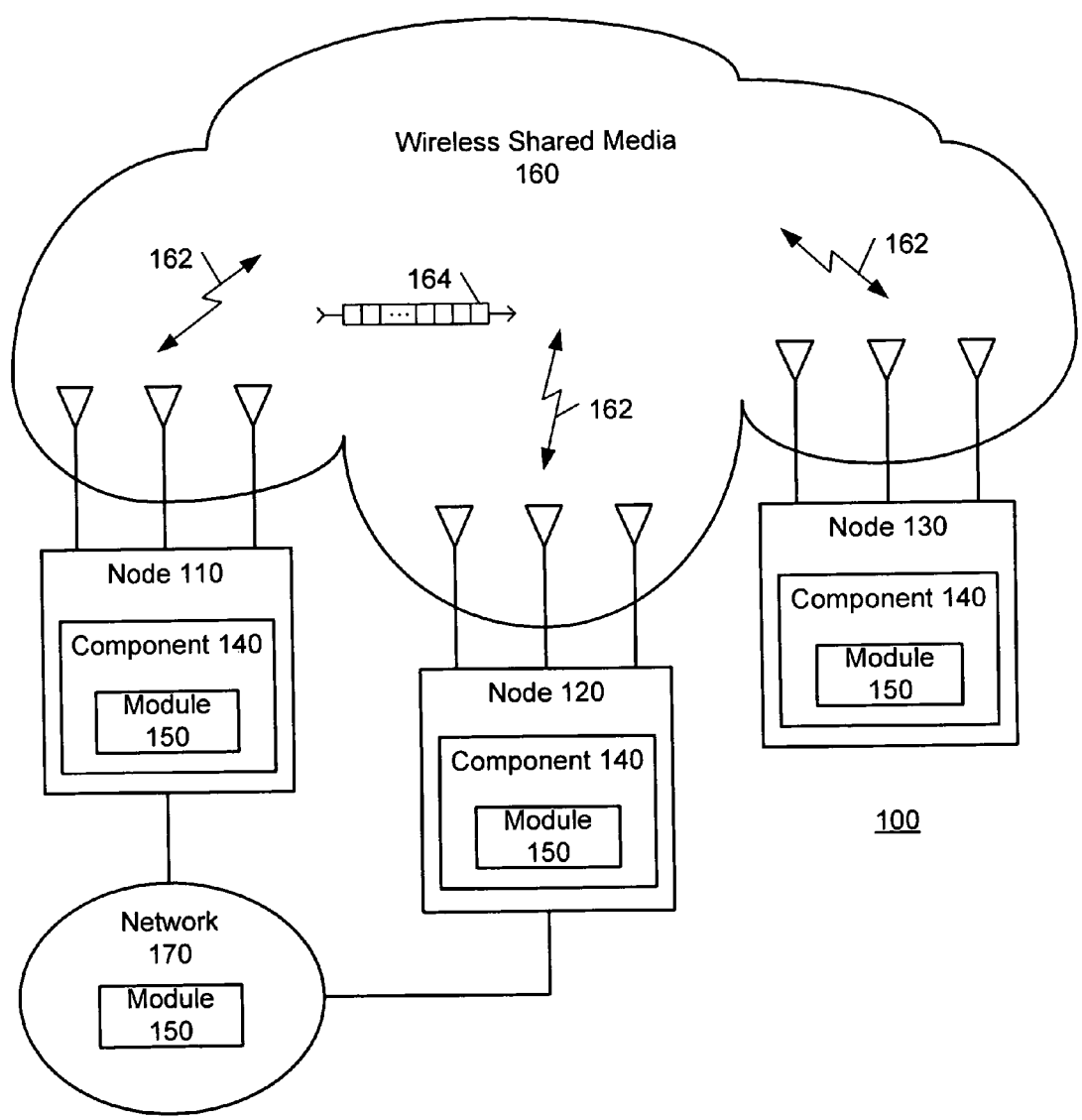
FIG. 1 illustrates a wireless system.

Various embodiments may be directed to techniques regarding a parallel systolic coordinate rotation digital computer (CORDIC) algorithm with reduced latency for unitary transform of complex matrices and its application to MIMO detection. Reference will now be made in detail to a description of these embodiments as illustrated in the drawings. While the embodiments will be described in connection with these drawings, there is no intent to limit them to drawings disclosed herein. On the contrary, the intent is to cover all alternatives, modifications, and equivalents within the spirit and scope of the described embodiments as defined by the accompanying claims.

One embodiment comprises a method for MIMO detection having a reduced computational complexity compared to current approaches. More specifically, an embodiment is a parallel CORDIC process, according to which multiple elements in a vector representing a received MIMO signal may be processed in parallel. The result is a reduction in the computational complexity of the MIMO detection method as measured by the required resources (e.g., on-chip adders and the like) and the latency (e.g., clock cycles required by the process).

FIG. 1 illustrates an embodiment of a system. FIG. 1 illustrates a block diagram of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, a node may comprise, or be implemented as, a computer system, a computer sub-system, a computer, an appliance, a workstation, a terminal, a server, a personal computer (PC), a laptop, an ultra-laptop, a handheld computer, a personal digital assistant (PDA), a set top box (STB), a telephone, a mobile telephone, a cellular telephone, a handset, a wireless access point, a base station (BS), a subscriber station (SS), a mobile subscriber center (MSC), a radio network controller (RNC), a microprocessor, an integrated circuit such as an application specific integrated circuit (ASIC), a programmable logic device (PLD), a processor such as general purpose processor, a digital signal processor (DSP) and/or a network processor, an interface, an input/output (I/O) device (e.g., keyboard, mouse, display, printer), a router, a hub, a gateway, a bridge, a switch, a circuit, a logic gate, a register, a semiconductor device, a chip, a transistor, or any other device, machine, tool, equipment, component, or combination thereof. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a network processor, and so forth. The embodiments are not limited in this context.

The nodes of the communications system 100 may be arranged to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The media and control information may be communicated from and to a number of different devices or networks.

In various implementations, the nodes of the communications system 100 may be arranged to segment a set of media information and control information into a series of packets. A packet generally may comprise a discrete data set having fixed or varying lengths, and may be represented in terms of bits or bytes. It can be appreciated that the described embodiments are applicable to any type of communication content or format, such as packets, cells, frames, fragments, units, and so forth.

The communications system 100 may communicate information in accordance with one or more standards, such as standards promulgated by the IEEE, the Internet Engineering Task Force (IETF), the International Telecommunications Union (ITU), the 3GPP and so forth. In various embodiments, for example, the communications system 100 may communicate information according to one or more IEEE 802 standards including IEEE 802.11 standards (e.g., 802.11a, b, g/h, j, n, and variants) for WLANs and/or 802.16 standards (e.g., 802.16-2004, 802.16.2-2004, 802.16e, 802.16f, and variants) for WMANs, and/or 3GPP LTE standards. The communications system 100 may communicate information according to one or more of the Digital Video Broadcasting Terrestrial (DVB-T) broadcasting standard and the High performance radio Local Area Network (HiperLAN) standard. The embodiments are not limited in this context.

In various embodiments, the communications system 100 may employ one or more protocols such as medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth.

The communications system 100 may include one or more nodes (e.g., nodes 110-130) arranged to communicate information over one or more wired and/or wireless communications media. Examples of wired communications media may include a wire, cable, printed circuit board (PCB), backplane, switch fabric, semiconductor material, twisted-pair wire, coaxial cable, fiber optics, and so forth. An example of a wireless communication media may include portions of a wireless spectrum, such as the radio-frequency (RF) spectrum. In such implementations, the nodes of the system 100 may include components and interfaces suitable for communicating information signals over the designated wireless spectrum, such as one or more transmitters, receivers, transceivers, amplifiers, filters, control logic, antennas and so forth.

The communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), a line card, a disc controller, video controller, audio controller, and so forth.

In various embodiments, the communications system 100 may comprise or form part of a network, such as a WiMAX network, a broadband wireless access (BWA) network, a WLAN, a WMAN, a wireless wide area network (WWAN), a wireless personal area network (WPAN), a Code Division Multiple Access (CDMA) network, a Wide-band CDMA (WCDMA) network, a Time Division Synchronous CDMA (TD-SCDMA) network, a Time Division Multiple Access (TDMA) network, an Extended-TDMA (E-TDMA) network, a Global System for Mobile Communications (GSM) network, an Orthogonal Frequency Division Multiplexing (OFDM) network, an Orthogonal Frequency Division Multiple Access (OFDMA) network, a North American Digital Cellular (NADC) network, a Universal Mobile Telephone System (UMTS) network, a third generation (3G) network, a fourth generation (4G) network, a local area network (LAN), a wide area network (WAN), a metropolitan area network (MAN), the Internet, the World Wide Web, a cellular network, a radio network, a satellite network, and/or any other communications network configured to carry data. The embodiments are not limited in this context.

The communications system 100 may employ various modulation techniques including, for example: OFDM modulation, Quadrature Amplitude Modulation (QAM), N-state QAM (N-QAM) such as 16-QAM (four bits per symbol), 32-QAM (five bits per symbol), 64-QAM (six bits per symbol), 128-QAM (seven bits per symbol), and 256-QAM (eight bits per symbol), Differential QAM (DQAM), Binary Phase Shift Keying (BPSK) modulation, Quadrature Phase Shift Keying (QPSK) modulation, Offset QPSK (OQPSK) modulation, Differential QPSK (DQPSK), Frequency Shift Keying (FSK) modulation, Minimum Shift Keying (MSK) modulation, Gaussian MSK (GMSK) modulation, and so forth. The embodiments are not limited in this context.

The communications system 100 may form part of a multi-carrier system such as a MIMO system. The MIMO system may employ one or more multi-carrier communications channels for communicating multi-carrier communication signals. A multi-carrier channel may comprise, for example, a wideband channel comprising multiple sub-channels. The MIMO system may be arranged to communicate one or more spatial data streams using multiple antennas. Examples of an antenna include an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, the communications system 100 may be arranged to detect a MIMO system. More specifically, the communications system 100 may be arranged to detect a MIMO system with a method that employs a decomposition of a received MIMO signal to simplify the detection of the MIMO system. More specifically, the decomposition may be a QR decomposition (QRD) for which the matrix representing a received MIMO signal may be transformed to an up-triangular matrix to simplify, for example, inverting the matrix as may be required by the MIMO system detection. The communications system 100 of an embodiment may be further arranged to transform the matrix representing the received MIMO signal to an up-triangular matrix by converting the elements of the matrix to real numbers and applying a CORDIC algorithm and a rotation algorithm to each row of the matrix in parallel to reduce the complexity of the communications system 100 of an embodiment and the latency generated by the processes thereby.

In one embodiment, communications system 100 may include one or more wireless communication devices, such as nodes 110-130. Nodes 110-130 all may be arranged to communicate information signals using one or more wireless transmitters/receivers ("transceivers") or radios, which may involve the use of radio frequency communication via 802.11 schemes, 802.16 schemes (e.g., 802.16-2004, 802.16.2-2004, 802.16e, 802.16f, and variants), and 3GGP (e.g., 3GGP LTE) for example. Nodes 110-130 may communicate using the radios over wireless shared media 160 via multiple links or channels established therein. Although FIG. 1 is shown with a limited number of nodes in a certain topology, it may be appreciated that communications system 100 may include additional or fewer nodes in any type of topology as desired for a given implementation. The embodiments are not limited in this context.

Further, nodes 110, 120 may comprise fixed devices having wireless capabilities. A fixed device may comprise a generalized equipment set providing connectivity, management, and control of another device, such as mobile devices. Examples for nodes 110, 120 may include a wireless access point (AP), base station or node B, router, switch, hub, gateway, media gateway, and so forth. In an embodiment, nodes 110, 120 may also provide access to a network 170 via wired communications media. Network 170 may comprise, for example, a packet network such as the Internet, a corporate or enterprise network, a voice network such as the Public Switched Telephone Network (PSTN), among other WANs, for example. The embodiments are not limited in this context.

In one embodiment, system 100 may include node 130. Node 130 may comprise, for example, a mobile device or a fixed device having wireless capabilities. A mobile device may comprise a generalized equipment set providing connectivity to other wireless devices, such as other mobile devices or fixed devices. Examples for node 130 may include a computer, server, workstation, notebook computer, handheld computer, telephone, cellular telephone, personal digital assistant (PDA), combination cellular telephone and PDA, and so forth.

Nodes 110-130 may have one or more wireless transceivers and wireless antennas. In one embodiment, for example, nodes 110-130 may each have multiple transceivers and multiple antennas (e.g., a MIMO system) to communicate information signals over wireless shared media 160. For example, a channel 162, link, or connection may be formed using one or more frequency bands of wireless shared medium 160 for transmitting and receiving packets 164. The embodiments are not limited in this context.

Figure 2:
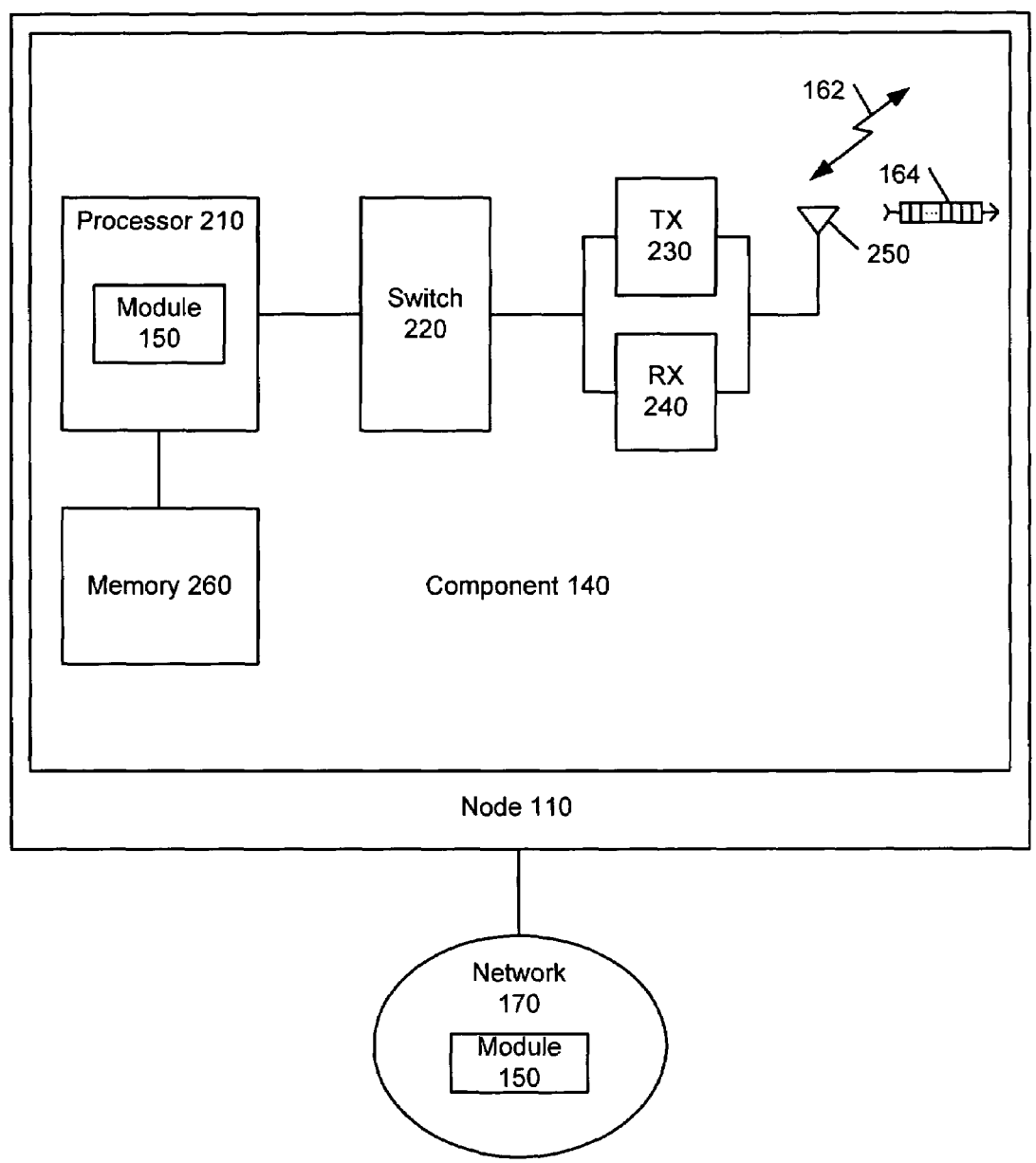
FIG. 2 illustrates a wireless system node.

FIG. 2 more specifically illustrates node 110 of the communications system 100. As shown in FIG. 2, the node may comprise multiple elements such as component 140, module 150, processor 210, memory 260, switch 220, transmitter 230, receiver 240, and antenna 250 to communicate packets 164 over wireless shared media 160. Transmitter 230 and receiver 240 may also be collectively referred to as a transceiver. Antenna 250 may include an internal antenna, an omni-directional antenna, a monopole antenna, a dipole antenna, an end fed antenna or a circularly polarized antenna, a micro-strip antenna, a diversity antenna, a dual antenna, an antenna array, and so forth. There may further be multiple antennas (e.g., a MIMO system). Some elements may be implemented using, for example, one or more circuits, components, registers, processors, software subroutines, or any combination thereof. Although FIG. 2 shows a limited number of elements, it can be appreciated that additional or fewer elements may be used in node 110 as desired for a given implementation. The embodiments are not limited in this context.

As noted, in an embodiment, node 110 may include a processor 210. Processor 210 may be connected to switch 220 and/or the transceiver (e.g., transmitter 230 and receiver 240). Processor 210 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In an embodiment, for example, processor 210 may be implemented as a general purpose processor, such as a processor made by Intel® Corporation, Santa Clara, Calif. Processor 210 may also be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments are not limited in this context.

In one embodiment, processor 210 may include, or have access to, memory 260. Memory 260 may comprise any machine-readable media. Memory 260 may be implemented using any machine-readable or computer-readable media capable of storing data, including both volatile and non-volatile memory. For example, memory 260 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 260 may be included on the same integrated circuit as processor 210, or alternatively some portion or all of memory 260 may be disposed on an integrated circuit or other medium, for example a hard disk drive, that is external to the integrated circuit of processor 210. The embodiments are not limited in this context.

When implemented in a node of communications system 100, node 110 may be arranged to communicate information over wireless communications media between the various nodes, such as nodes 120 and 130. The information may be communicated in the form of packets 164 over wireless shared media 160, with each packet 164 comprising media information and/or control information. The media and/or control information may be represented using, for example, multiple Orthogonal Frequency Division Multiplexing (OFDM) symbols. A packet 164 in this context may refer to any discrete set of information, including a unit, frame, cell, segment, fragment, and so forth. The packet may be of any size suitable for a given implementation. The embodiments are not limited in this context.

FIG. 3 through FIG. 8 more specifically describe, for example, the MIMO detection of the communications system 100 and/or node 110. For example, a linear MIMO channel can be expressed by Equation (1) as follows:

$$Y_N = H_{N \times M} \cdot X_M \qquad (1)$$

In Equation (1), M is the number of transmitter antenna, N is the number of receive antenna, $X_M$ is the transmitted signal, $Y_N$ is the received signal. $H_{N \times M}$ is the N×M channel state information (CSI) matrix. In an 802.11, 802.16, or 3GGP system, for example, information can be spatially transmitted from M transmit antennas, and received by N receive antennas. Channel estimation may be used to estimate the CSI. For such a system, MIMO detection module may be used to detect the originally transmitted signal $X_M$ based on the received $Y_N$ and estimated CSI matrix $H_{N \times M}$. The MIMO detection algorithm processed by the MIMO detection module may be either linear or non-linear. A linear MIMO detection algorithm uses the linear equation to obtain a weight vector, and thereafter multiplies the received multiplexed signal by the weight vector to obtain the estimated transmitted signal. Current approaches for linear MIMO detection include Zero Forcing (ZF) and Minimum Mean Square Error (MMSE). The equations for ZF and MMSE detection are shown in Equations (2) and (3) as follows:

$$ZF: \hat{X}_M = W \cdot Y_N = (H^H H)^{-1} H^H \cdot Y_N \qquad (2)$$

$$\text{MMSE:} \hat{X}_M = W \cdot Y_N = (H^H H + \rho I)^{-1} H^H \cdot Y_N \quad (3)$$

In addition to the variables listed above, W is a weight matrix, H is a channel state information matrix, I is the identical matrix, and ρ is a reciprocal to a signal-to-noise ratio (SNR). A hardware block implementing either the ZF or MMSE algorithm may include a weight calculation unit. In general, the weight calculation unit may calculate the inverse of the received signal matrix. When M and N are large however (e.g., 4×4) the complexity of matrix inversion, in particular by directly calculating the inverse, is significant. For such a case, an effective way to hardware solve the matrix inversion is to use either a QR Decomposition (QRD) method, or singular value decomposition (SVD) method. The QRD method calculates unitary matrices Q and a triangular matrix R such that H=QR. Accordingly, the inverse of matrix H can be found as shown in Equation (4) as follows:

$$H^{-1} = (QR)^{-1} = R^{-1} Q^{-1} = R^{-1} Q^H \quad (4)$$

The inverse matrix for unitary matrix Q may be calculated as a Hermitian transposed matrix and the inversion of the triangular matrix R may be straightforwardly calculated with back substitution. QRD in particular may be treated as a unitary matrix transformation that makes the received signal matrix triangular. The triangularization may in turn be implemented by zeroing down triangular elements of the received signal matrix column by column. Accordingly, one of the basic operations of a MIMO detection process may be to zero column elements for every received signal matrix column except for the most upper column.

An additional MIMO detection algorithm is the square-root algorithm that is substantially similar to the MMSE algorithm, but with a lower computational complexity because it is division-free. A basic operation of the square-root algorithm is to determine the MMSE weight (e.g., to be used by equation (3) may be calculated as follows for a 4×4 illustrative matrix as shown in Equation (5) as follows:

$$X = \begin{pmatrix} x_{1,1} & x_{1,2} & x_{1,3} & x_{1,4} \\ x_{2,1} & x_{2,2} & x_{2,3} & x_{2,4} \\ x_{3,1} & x_{3,2} & x_{3,3} & x_{3,4} \\ x_{4,1} & x_{4,2} & x_{4,3} & x_{4,4} \end{pmatrix} \quad (5)$$

Through a unitary transform, each of the first row elements may be zeroed except for the first column as follows for which Σ is the unitary transform as shown in Equation (6) as follows:

$$Y = \sum X = \begin{pmatrix} y_{1,1} & 0 & 0 & 0 \\ y_{2,1} & y_{2,2} & y_{2,3} & y_{2,4} \\ y_{3,1} & y_{3,2} & y_{3,3} & y_{3,4} \\ y_{4,1} & y_{4,2} & y_{4,3} & y_{4,4} \end{pmatrix} \quad (6)$$

The basic operation of QRD is the same as Equation (6). For example, the QRD process zeros $x_{1,2}$, $x_{1,3}$, and $x_{1,4}$ in a first iteration. Thereafter the QRD process zeros $x_{2,3}$ and $x_{2,4}$ in a second iteration and $x_{3,4}$ in a third iteration to obtain an up-triangular matrix. The unitary transform to zero elements for the received signal matrix plays an important role for QRD, SVD, and other MIMO detection methods.

The unitary transform of Equation (6) may be solved by a Givens transform. A Givens transform is one instance of a triangular transform and is particularly suitable for CORDIC implementation. The CORDIC algorithm is a simple and efficient algorithm to calculate hyperbolic and trigonometric functions. The CORDIC algorithm is an iterative algorithm that only contains adders and shifters (and typically not a multiplier) and is accordingly suitable for VLSI implementation. However, the Givens transform can only zero one matrix element at a time, and its CORDIC implementation requires both angle calculation (e.g., vector mode) and vector transform (e.g., rotation mode). The result is that the latency (e.g., number of clock cycles required to complete the transform) of such an implementation may be significant. Further, the complexity may further limit the practicability of such an implementation.

Figure 3:
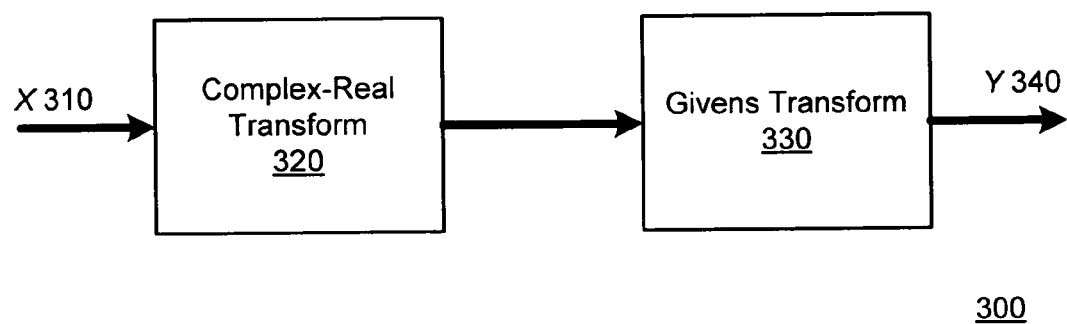
FIG. 3 illustrates a block diagram of a Givens transformation.

More specifically, FIG. 3 illustrates a block diagram 300 of a transform to apply Equation (6) to a received signal X 310. At block 320, the elements of the first row of, for example, a 4×4 received signal X 310 are converted from complex to real values. At block 330, the Givens transform is applied to the output of block 320 to zero one element of the first row. Blocks 320 and 330 may be repeated to zero additional elements of the first row of received signal X 310 until all but one column is zeroed. For example, if received signal X 310 is a 4×4 matrix, the complex to real and Givens transformations of blocks 320 and 300 respectively, will be repeated to zero the second, third, and fourth columns of the first row of received signal X 310.

Figure 4:
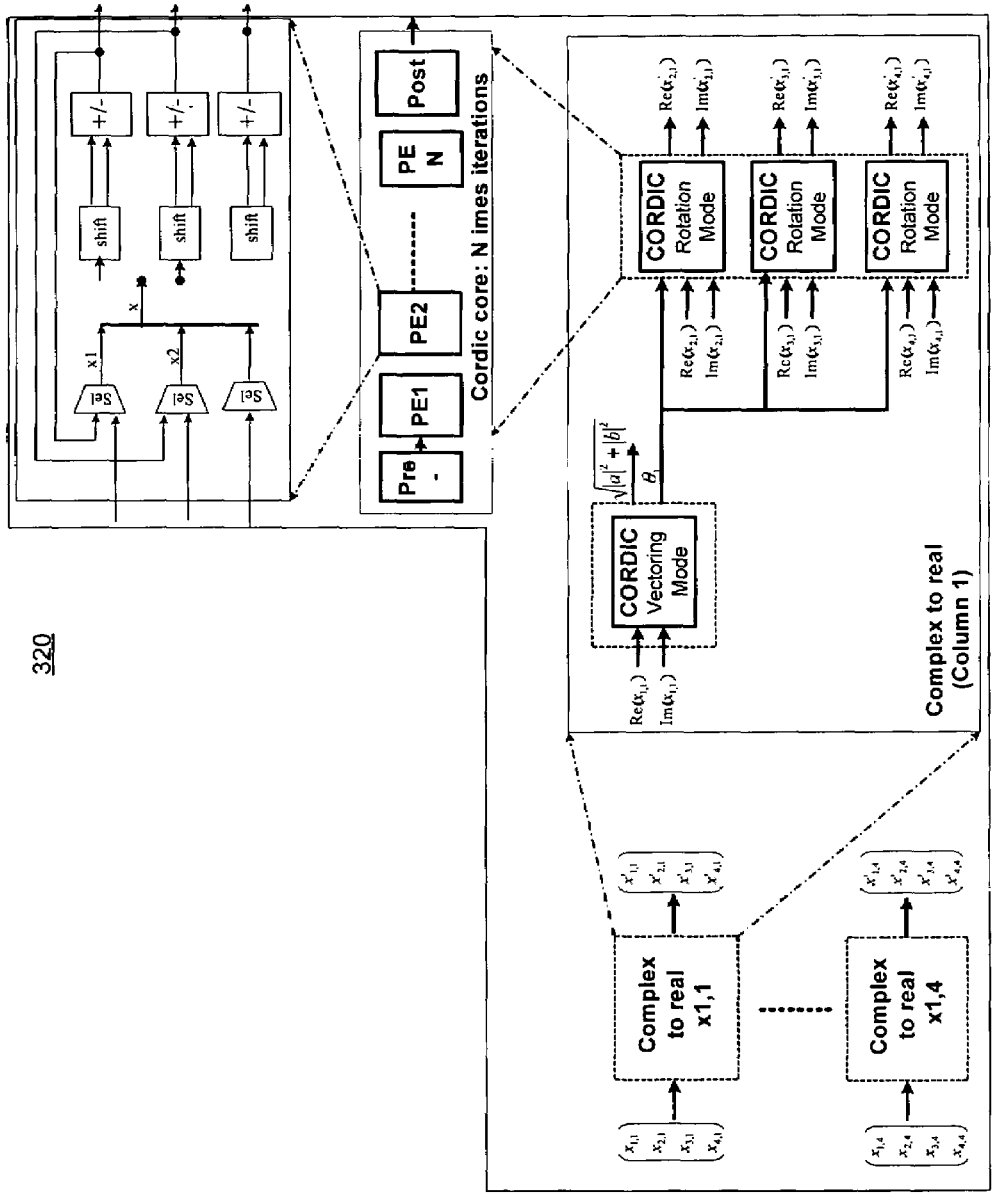
FIG. 4 illustrates a block diagram of a complex to real converter module.
Figure 5:
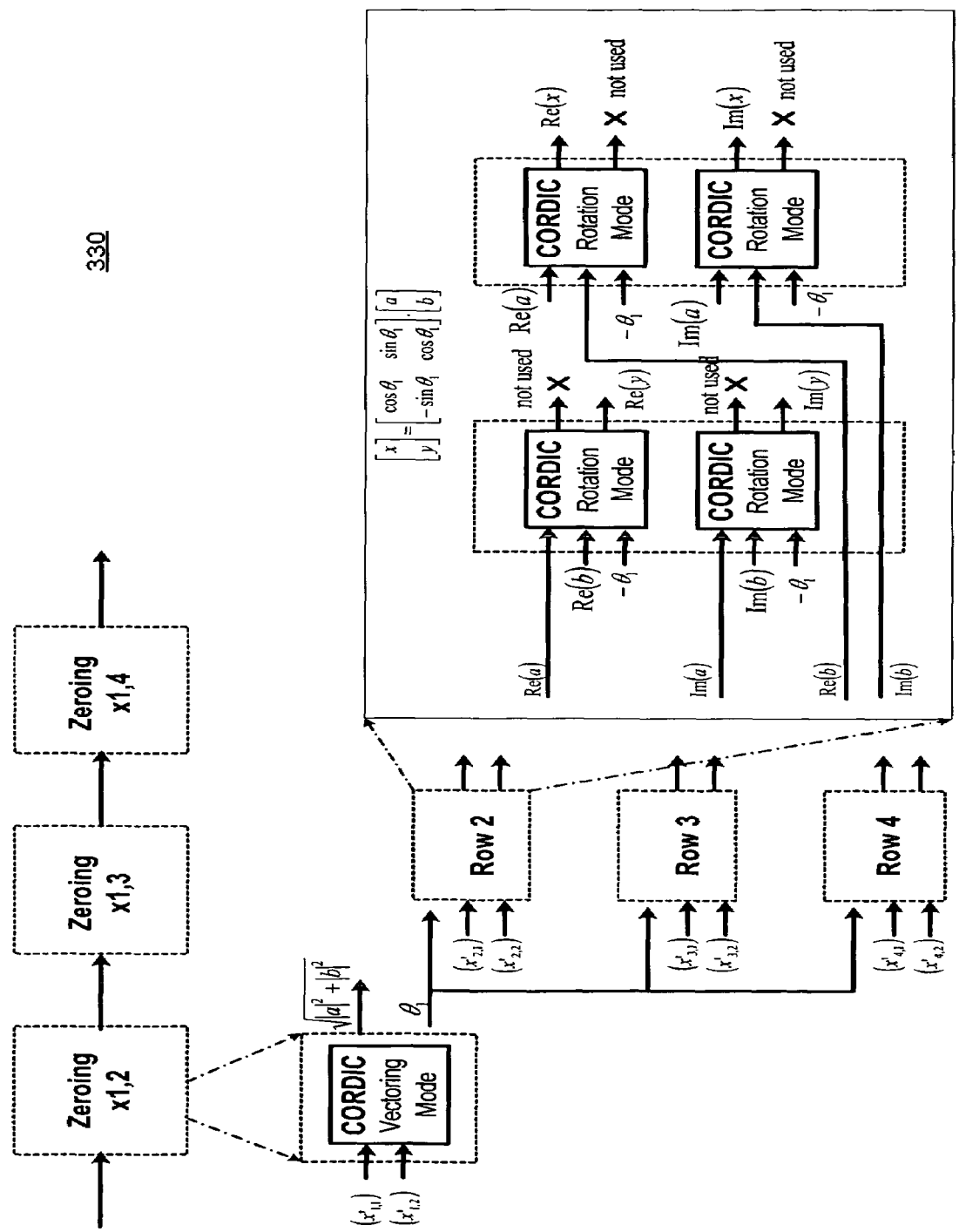
FIG. 5 illustrates a block diagram of a Givens transform module.

FIGS. 4 and 5 more specifically illustrate a structure to accomplish the complex to real and Givens transforms highlighted by FIG. 3. FIG. 4 illustrates the detailed structure of complex to real transform module (e.g., block 320) implemented by a CORDIC algorithm. The complex to real transform module 320 first calculates the angle of the complex elements of the first row of the received signal matrix and thereafter rotates the column elements based on the angle. To do so, the CORDIC algorithm uses a "vectoring mode" to calculate the angle and a "rotation mode" to rotate other elements in the same column. After the first row elements of the received signal matrix are converted to real value, the Givens transform module (e.g., block 330) illustrated in detail by FIG. 5 may be applied. The Givens transform module first calculates the angle between elements of the first row, and then rotates the elements of corresponding two columns. For example, the block "zeroing x1,2" will rotate the first and second columns according to the angle between $x_{1,1}'$ and $x_{1,2}'$ and so on for blocks "zeroing x1,3" and "zeroing x1,4."

In particular, the CORDIC algorithm for the Givens transform (e.g., performed my Givens transform module 330) may be represented by the following iterative Equation (7):

$$\begin{bmatrix} x_{0,k} \\ x_{1,k} \end{bmatrix} = R_k \cdot \begin{bmatrix} x_{0,k-1} \\ x_{1,k-1} \end{bmatrix} = \begin{pmatrix} 1 - 2t_k^2 & 2\sigma_{1,k} t_k \\ -2\sigma_{1,k} t_k & 1 - 2t_k^2 \end{pmatrix} \cdot \begin{bmatrix} x_{0,k-1} \\ x_{1,k-1} \end{bmatrix} \quad (7)$$

$$\sigma_{1,k} = \text{sign}(x_{0,k-1}) \times \text{sign}(x_{1,k-1})$$

$$t_k = 2^{-k}, k = 1, 2, 3 \ldots N$$

In "vector mode," the Givens transform module 330 transforms the second element (e.g., $x_{1,2}$) to zero and obtains the Euliad distance of vector $[x_1 \ x_2]$. The Givens transform module 330 further calculates the angle of vector $[x_1 \ x_2]$. In "rotation mode," the Givens transform module rotates the vector by input angle. In order for the iteration to converge, the input vector to the Givens transform module 330 must be in the first quadrant. Accordingly, a pre- and/or post-process module may be needed to ensure the input signal is in the first quadrant.

One of the drawbacks of the algorithm represented by Equation (7) is that the input comprises only two elements. As a result, in order to zero multiple matrix elements, the Givens transform module 330 may have to be used multiple times for multiple iterations of Equation (7). Further, in order to zero multiple elements of the same column, the Givens transform module 330 may work both in "vector mode" and "rotation mode." The multiple iterations and multiple modes may substantially increase the complexity and latency of the Givens transform module 330. For the above 4×4 matrix example, and assuming each CORDIC algorithm includes 14 iterations, a total of 2310 adders may be necessary for a pipelined throughput (e.g., output one result in one clock cycle). Further, for the 4×4 matrix example the latency is 196 clock cycle. Both the complexity of the required number of adders and latency may impede the practicability of such a structure.

In order to reduce the latency and complexity, an embodiment employs a parallel CORDIC algorithm and a group rotation method to solve equation (6). The embodiment may be used as part of QRD, SVD, unitary transform, and MIMO detection algorithms. Its iteration Equation (8) is as following:

$$\begin{bmatrix} x_{0,k} \\ x_{1,k} \\ \dots \\ x_{N-1,k} \end{bmatrix} = \begin{bmatrix} 1-(N-1)t_k^2 & 2\sigma_{1,k}t_k & \cdots & 2\sigma_{N-1,k}t_k \\ -2\sigma_{1,k}t_k & 1-(N+1)t_k^2 & \cdots & -2\sigma_{1,k}\sigma_{N-1,k}t_k^2 \\ \dots & \dots & \dots & \dots \\ -2\sigma_{N-1,k}t_k & -2\sigma_{1,k}\sigma_{N-1,k}t_k^2 & \cdots & 1-(N+1)t_k^2 \end{bmatrix} \begin{bmatrix} x_{0,k-1} \\ x_{1,k-1} \\ \dots \\ x_{N-1,k-1} \end{bmatrix} \quad (8)$$

$$\sigma_{i,k} = \text{sign}(x_{0,k-1}^1) \times \text{sign}(x_{i,k-1}^1) \quad i = 0 \dots N-1$$
$$t_k = 2^{-k}, k = 1, 2, 3 \dots N'$$

The parallel CORDIC algorithm of Equation (8) can zero multiple elements in a vector at the same time, substantially obviating the complexity and latency generated by the implementation of, for example, Equation (7). Further, the parallel CORDIC algorithm of an embodiment has no convergence problem as any data can satisfy the convergence requirement.

As noted, Equation (8) can zero multiple elements in a vector. As further noted, the rows of the matrix other than the first row may be rotated by a calculated angle with respect to the first row of the matrix. In addition to the parallel CORDIC algorithm, an embodiment further employs a group rotation. For example, the group rotation of an embodiment iterates the first row of the matrix by, for example, Equation (8) and then the other rows of the matrix are rotated according to the direction of the first row. The module for the rotation of the first row may be accordingly treated as a master iteration module and the modules for the other rows of the received signal matrix may be treated as slave iteration modules, as the slave iteration modules, as will be illustrated by the following equations, receives the rotation direction from the master iteration module. For the master iteration module, it rotates the first row vector $X^1$ according to Equation (8) for which N is the length of the vector and N' is the total number of iterations. N' may be determined by a precision requirement. For example, for a 16-bit input signal, 14 iterations may satisfy the precision requirement.

$$X^1 = \begin{bmatrix} x_0^1 \\ x_{1,k}^1 \\ \dots \\ x_{N-1}^1 \end{bmatrix} \quad (9)$$

$$\begin{bmatrix} x_{0,k}^1 \\ x_{1,k}^1 \\ \dots \\ x_{N-1,k}^1 \end{bmatrix} = \begin{bmatrix} 1-(N-1)t_k^2 & 2\sigma_{1,k}t_k & \cdots & 2\sigma_{N-1,k}t_k \\ -2\sigma_{1,k}t_k & 1-(N+1)t_k^2 & \cdots & -2\sigma_{1,k}\sigma_{N-1,k}t_k^2 \\ \dots & \dots & \dots & \dots \\ -2\sigma_{N-1,k}t_k & -2\sigma_{1,k}\sigma_{N-1,k}t_k^2 & \cdots & 1-(N+1)t_k^2 \end{bmatrix} \begin{bmatrix} x_{0,k-1}^1 \\ x_{1,k-1}^1 \\ \dots \\ x_{N-1,k-1}^1 \end{bmatrix} \quad (10)$$

$$\sigma_{i,k} = \text{sign}(x_{0,k-1}^1) \times \text{sign}(x_{i,k-1}^1) \quad i = 0 \dots N-1$$
$$t_k = 2^{-k}, k = 1, 2, 3 \dots N'$$

For the slave iteration module, it rotates the other row vectors $X^m$ (where m is the row index) according to the following equations for which the direction $\sigma_{m,k}$ is provided by the master iteration module as shown by Equations (11) and (12) as follows:

$$X^m = \begin{bmatrix} x_0^m \\ x_1^m \\ \dots \\ x_{n-1}^m \end{bmatrix} \quad (11)$$

$$\begin{bmatrix} x_{0,k}^m \\ x_{1,k}^m \\ \dots \\ x_{N-1,k}^m \end{bmatrix} = \begin{bmatrix} 1-(N-1)t_k^2 & 2\sigma_{1,k}t_k & \cdots & 2\sigma_{N-1,k}t_k \\ -2\sigma_{1,k}t_k & 1-(N+1)t_k^2 & \cdots & -2\sigma_{1,k}\sigma_{N-1,k}t_k^2 \\ \dots & \dots & \dots & \dots \\ -2\sigma_{N-1,k}t_k & -2\sigma_{1,k}\sigma_{N-1,k}t_k^2 & \cdots & 1-(N+1)t_k^2 \end{bmatrix} \begin{bmatrix} x_{0,k-1}^m \\ x_{1,k-1}^m \\ \dots \\ x_{N-1,k-1}^{m1} \end{bmatrix} \quad (12)$$

$$\sigma_{i,k} = \text{sign}(x_{0,k-1}^1) \times \text{sign}(x_{i,k-1}^1) \quad i = 0 \dots N-1$$
$$t_k = 2^{-k}, k = 1, 2, 3 \dots N'$$

Figure 6:
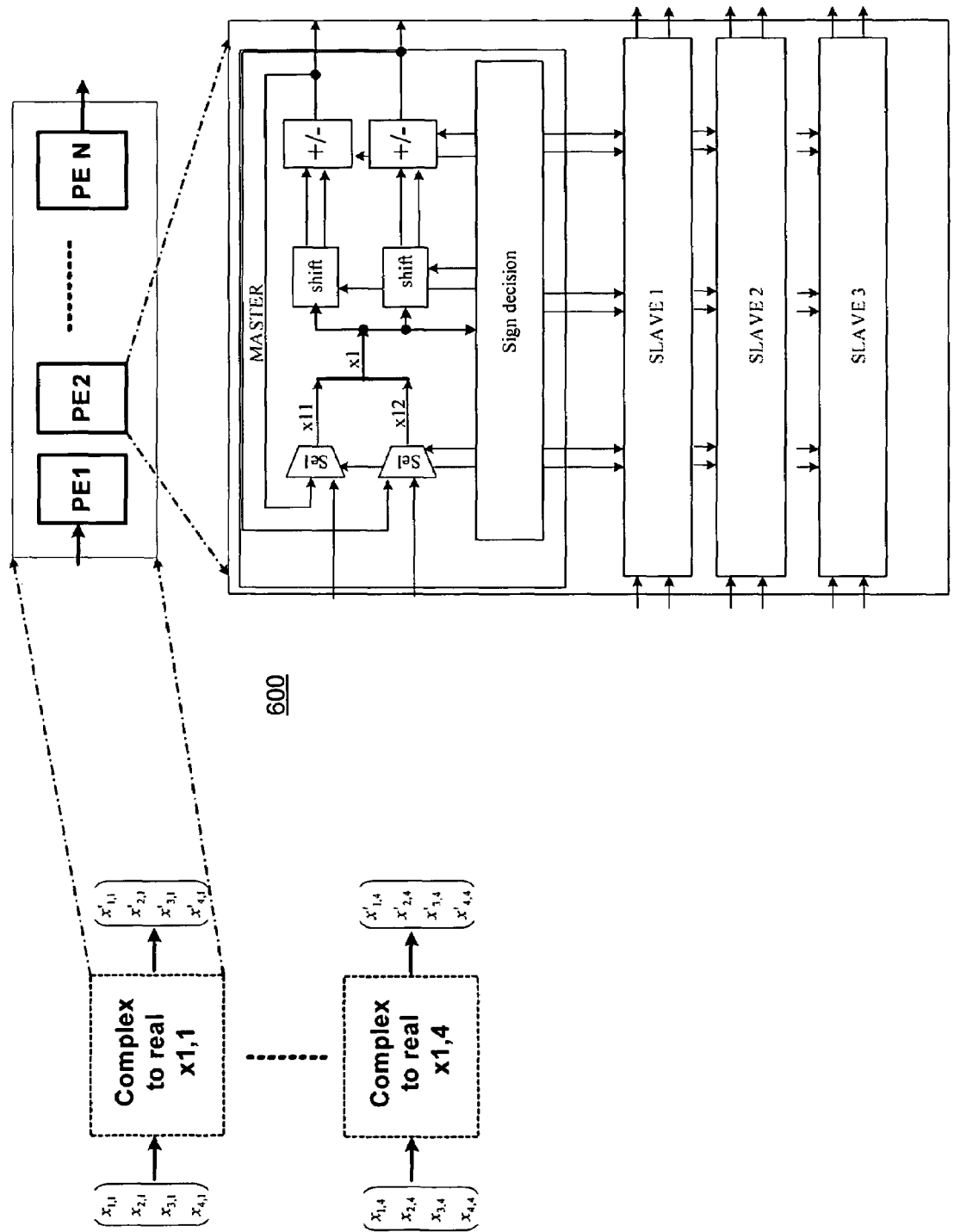
FIG. 6 illustrates a block diagram of a complex to real converter module of an embodiment.
Figure 7:
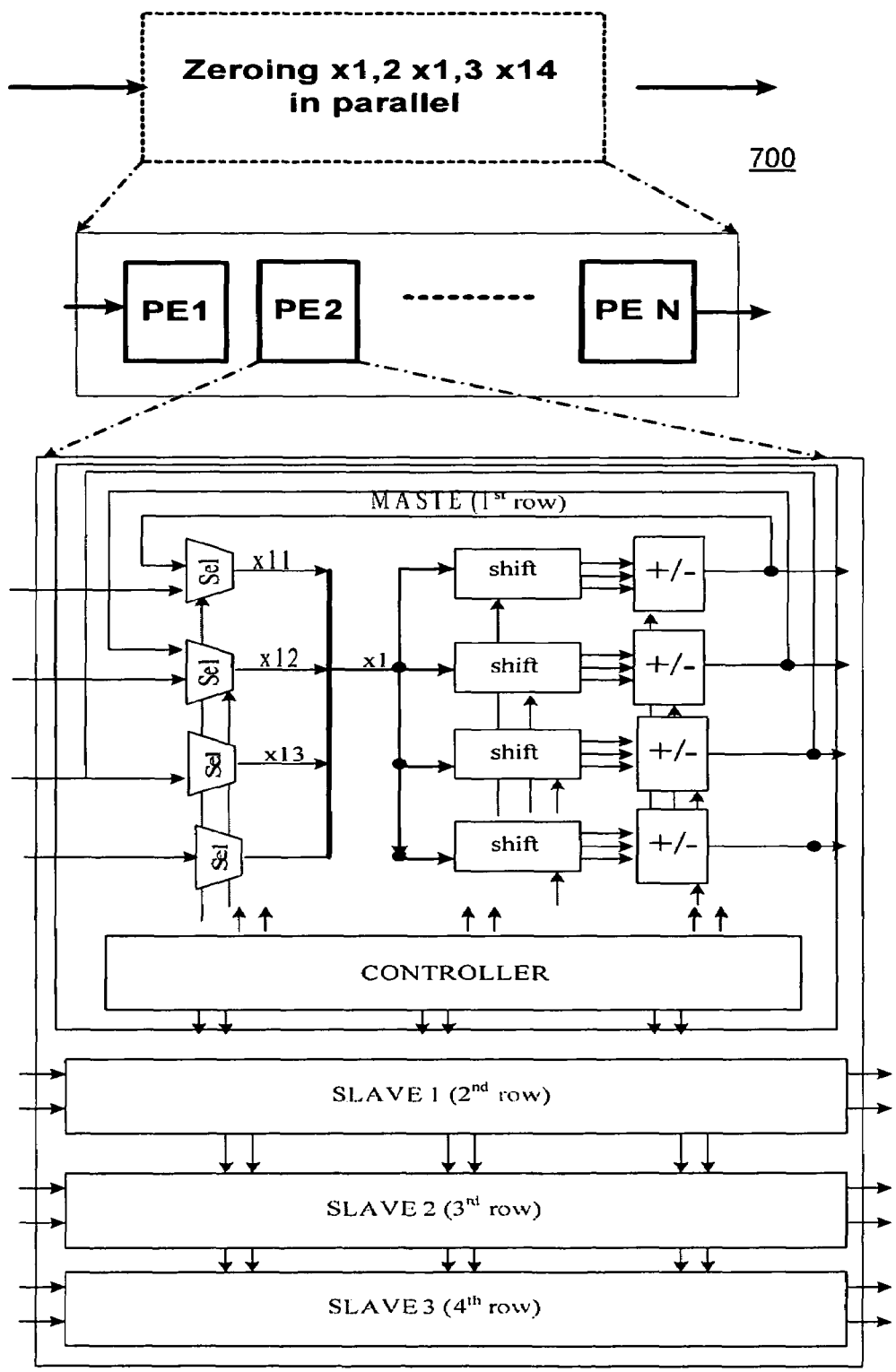
FIG. 7 illustrates a block diagram of a zeroing module of an embodiment.

Equations (9) through (12) may be implemented according to the block diagrams 600 and 700 of FIG. 6 and FIG. 7 respectively for a received signal matrix (e.g., 4×4 matrix). More specifically, FIG. 6 is the parallel CORDIC algorithm embodiment of the complex to real transform module 320 of FIG. 4. Similarly, FIG. 7 illustrates zeroing multiple columns of the received signal matrix in parallel. Of note for each block diagram 600 and 700 is that once the first row has been converted from complex to real and σ calculated at the master iteration module, that rotation direction may then be passed to the slave iteration modules (as illustrated, there are three slave modules for a 4×4 received signal matrix) where the second, third, and fourth rows may be processed in parallel as explained with respect to Equations (9) through (12) In an embodiment, the CORDIC implementation of converting the first row from complex to real numbers requires 384 adders and with 14 iterations, generates a latency of 14 clock cycles. Zeroing the last three elements of the first row according to an embodiment adds 392 adders, and with 14 CORDIC iterations adds another 14 clock cycles. Accordingly, the total number of adders required for an embodiment with a 4×4 received signal matrix is 778 with a total latency of 28 clock cycles. If not processed in parallel according to an embodiment, the same process in series would require 2310 adders with a total latency of 196 clock cycles. An embodiment therefore reduces the resources required by approximately 66% and reduces the latency by approximately 700%.

Figure 8:
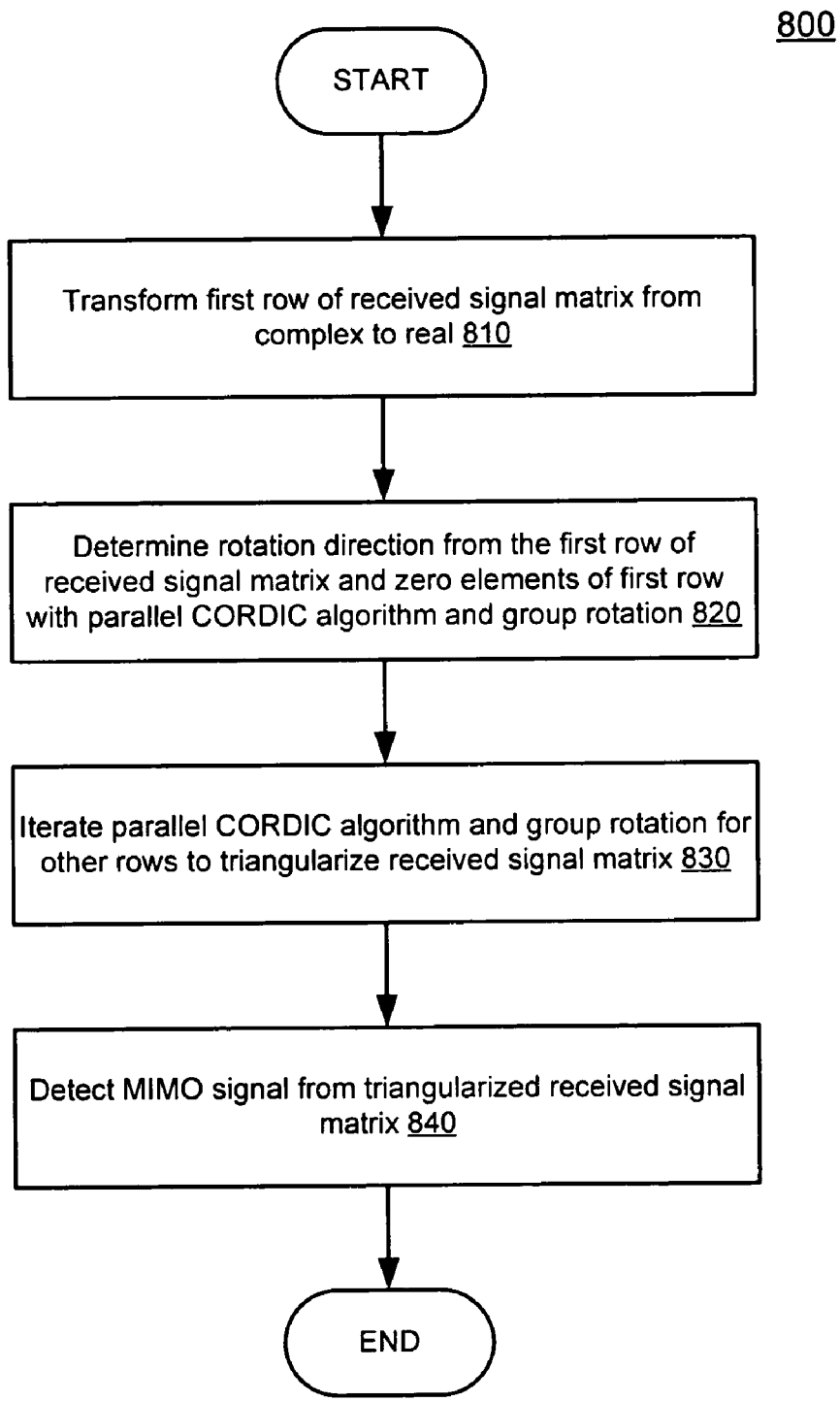
FIG. 8 illustrates a logic flow of an embodiment.

FIG. 8 illustrates a logic flow 800 of an embodiment. At 810, the first row of the matrix representing a MIMO channel is transformed from complex to real. At 820, the rotation direction σ is determined based on the transformed first row and the elements of the first row may be zeroed utilizing the parallel CORDIC algorithm and group rotation described by equations (9) though (12). In an embodiment, the elements of the first row may be zeroed utilizing the parallel CORDIC algorithm and group rotation described by equations (9) though (12) by a master iteration module. Once the rotation direction a is determined from the first row, it may be used to similarly process the remaining rows in parallel. For example, at 830 the remaining rows are processed in parallel according to equations (11) and (12) to zero row elements to triangularize the matrix representing the received MIMO signal. Thereafter, at 840 the MIMO signal may be detected with any MIMO detection method, and in particularly a MIMO detection method like ZF or MMSE that requires an inversion of the MIMO channel matrix that subsequently benefits from the matrix triangularization to reduce the computational complexity of the inversion.

Though described with reference to detecting a MIMO signal from a MIMO channel, the parallel CORDIC algorithm and group rotation method of an embodiment may further benefit any process that may require the inversion of a matrix for which the triangularization may decrease the complexity of the inversion. For example, the parallel CORDIC algorithm and group rotation method of an embodiment may be similarly applied to QR decomposition, singular value decomposition, and the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, also may mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, such as the examples given with reference to FIG. 2. For example, the memory unit may include any memory device, memory article, memory medium, storage device, storage article, storage medium and/or storage unit, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

What is claimed is:

1. An apparatus comprising:
a node including a master module and at least one slave module, the master module to
  transform the first row of a matrix from complex to real,
  rotate the first row of the matrix,
  determine a rotation direction from the first row of the matrix, and
  output the rotation direction to the slave module, the slave module to rotate another row of the matrix according to the rotation direction from the master module.

2. The apparatus of claim 1, the master module and the slave module to zero row elements of the matrix in parallel to transform the matrix to an up-triangular matrix.

3. The apparatus of claim 2, the matrix further comprising a MIMO channel, and the node to detect a MIMO signal from the MIMO channel.

4. A communications system comprising:
   a plurality of antennas; and
   a node including a master module and at least one slave module, the master module to transform the first row of a matrix from complex to real,
      rotate the first row of the matrix,
      determine a rotation direction from the first row of the matrix, and
      output the rotation direction to the slave module,
   the slave module to rotate another row of the matrix according to the rotation direction from the master module.

5. The communications system of claim 4, the master module and the slave module to zero row elements of the matrix in parallel to transform the matrix to an up-triangular matrix.

6. The communications system of claim 5, the matrix further comprising a MIMO channel, and the node to detect a MIMO signal from the MIMO channel.

7. A method comprising:
   transforming a first row of a matrix from complex to real using a master module of a node;
   rotating, by the master module, the first row of the matrix;
   determining, by the master module, a rotation direction from the transformed first row of the matrix;
   rotating, using a slave module of the node, another row of the matrix according to the rotation direction from the master module;
   zeroing at least an element of the first row of the matrix; and
   zeroing at least an element of the other row of the matrix in parallel with zeroing at least an element of the first row of the matrix.

8. The method of claim 7 further comprising;
   transforming the matrix to an up-triangular matrix.

9. The method of claim 8 further comprising:
   inverting the up-triangular matrix.

10. The method of claim 9 further comprising:
    detecting a MIMO signal from the inverted up-triangular matrix.

11. An article comprising a computer-readable storage medium containing instructions that if executed by a processor enable a communications system to:
    transform a first row of a matrix from complex to real;
    rotate the first row of the matrix;
    determine a rotation direction from the transformed first row of the matrix;
    zero at least an element of the first row of the matrix;
    zero at least an element of another row of the matrix in parallel with zeroing at least an element of the first row of the matrix; and
    rotate at least the other row according to the rotation direction.

12. The article of claim 11 further comprising instructions that if executed enable the communications system to:
    transform the matrix to an up-triangular matrix.

13. The article of claim 12 further comprising instructions that if executed enable the communications system to:
    invert the up-triangular matrix.

14. The article of claim 13 further comprising instructions that if executed enable the communications system to:
    detect a MIMO signal from the inverted up-triangular matrix.

* * * * *

UNITED STATES PATENT AND TRADEMARK OFFICE
CERTIFICATE OF CORRECTION

| | | |
|---|---|---|
| PATENT NO. | : 7,685,219 B2 | Page 1 of 1 |
| APPLICATION NO. | : 11/394898 | |
| DATED | : March 23, 2010 | |
| INVENTOR(S) | : Guangjie Li | |

It is certified that error appears in the above-identified patent and that said Letters Patent is hereby corrected as shown below:

In Sheet 4 of 8, Figure 4, line 6, delete "N imes" and insert -- N times --, therefor.

In column 12-13, line (s) 59-67 & 1-2, delete "1. An apparatus comprising:
a node including a master module and at least one slave module, the master module to transform the first row of a matrix from complex to real,
rotate the first row of the matrix,
determine a rotation direction from the first row of the matrix, and
output the rotation direction to the slave module,
the slave module to rotate another row of the matrix according to the rotation direction from the master module."
and insert -- 1. An apparatus comprising:
a node including a master module and at least one slave module, the master module to transform
    the first row of a matrix from complex to real,
    rotate the first row of the matrix,
    determine a rotation direction from the first row of the matrix, and
    output the rotation direction to the slave module,
the slave module to rotate another row of the matrix according to the rotation direction from the master module. --, therefor.

Signed and Sealed this

Twenty-fifth Day of May, 2010

David J. Kappos
*Director of the United States Patent and Trademark Office*